(12) United States Patent
Douglas et al.

(10) Patent No.: US 12,061,538 B2
(45) Date of Patent: Aug. 13, 2024

(54) SYSTEMS AND METHODS FOR CONTINUOUS TESTING OF MICROSERVICE APPLICATIONS

(71) Applicant: Red Hat, Inc., Raleigh, NC (US)

(72) Inventors: Stuart Douglas, Orange (AU); Clement Escoffier, Valence (FR)

(73) Assignee: Red Hat, Inc., Raleigh, NC (US)

( * ) Notice: Subject to any disclaimer, the term of this patent is extended or adjusted under 35 U.S.C. 154(b) by 177 days.

(21) Appl. No.: 17/702,102

(22) Filed: Mar. 23, 2022

(65) Prior Publication Data

US 2023/0305951 A1    Sep. 28, 2023

(51) Int. Cl.
*G06F 11/36* (2006.01)
*G06F 8/60* (2018.01)

(52) U.S. Cl.
CPC .......... *G06F 11/3688* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 9,842,045 B2 | 12/2017 | Heorhiadi et al. | |
| 10,178,045 B2 | 1/2019 | Kumar | |
| 10,489,279 B2 | 11/2019 | Rajagopalan et al. | |
| 10,656,929 B2 | 5/2020 | Jamjoom et al. | |
| 10,691,514 B2 | 6/2020 | McClory et al. | |
| 10,809,984 B2 * | 10/2020 | Mizrahi | G06F 40/242 |
| 11,314,630 B1 * | 4/2022 | Perumal | G06F 11/3688 |
| 11,934,947 B2 * | 3/2024 | Gupta | G06N 3/08 |
| 2019/0235993 A1 * | 8/2019 | Modeel | G06F 8/60 |
| 2020/0242254 A1 * | 7/2020 | Velur | G06F 21/552 |
| 2021/0216291 A1 | 7/2021 | White | |
| 2021/0216444 A1 * | 7/2021 | Gefen | G06F 11/3688 |
| 2022/0019520 A1 * | 1/2022 | Katdare | G06F 11/3684 |
| 2022/0269582 A1 * | 8/2022 | Spiro | G06F 11/3664 |

OTHER PUBLICATIONS

Savchenko, "Microservices Validation: Methodology and Implementation", 2015, Proceedings of the 1st Ural Workshop on Parallel, Distributed, and Cloud Computing for Young Scientists (Ural-PDC 2015) (Year: 2015).*

(Continued)

*Primary Examiner* — Hossain M Morshed
(74) *Attorney, Agent, or Firm* — Kilpatrick Townsend & Stockton LLP (57) ABSTRACT

The present disclosure provides new and innovative systems and methods for continuous testing of microservice applications. In an example, a computer-implemented method includes obtaining changes to source code, determining at least one related microservice related to the source code, determining at least one related microservice test related to the at least one microservice, executing automated tests to validate the source code, executing the at least one related microservice test to validate the at least one related microservice, generating test outcome data based on the automated tests and the at least one related microservice test, and providing a notification based on the test outcome data.

20 Claims, 5 Drawing Sheets

(56) References Cited

OTHER PUBLICATIONS

Ma, Shang-Pin, et al. "Using Service Dependency Graph to Analyze and Test Microservices." pp. 81-86, Jun. 8, 2018 Computer Science, 2018 IEEE 42nd Annual Computer Software and Applications Conference (COMPSAC)—6 Pages DOI:10.1109/COMPSAC.2018. 10207 Corpus ID: 52055889.

Ma, Shang-Pin et al. "Graph-based and scenario-driven microservice analysis, retrieval, and testing", Future Generation Computer Systems, vol. 100, pp. 724-735, Nov. 2019, ISSN 0167-739X, Elsevier B.V. 12 Pages https://doi.org/10.1016/j.future.2019.05.048. (https://www.sciencedirect.com/science/article/pii/S0167739X19302614).

* cited by examiner

SYSTEMS AND METHODS FOR CONTINUOUS TESTING OF MICROSERVICE APPLICATIONS

BACKGROUND

Computer systems may run applications or services that are provided via a server or cloud. The applications or services can be developed and deployed as commercial or enterprise offerings. The applications or services can be deployed as a single unit or as multiple units.

SUMMARY

The present disclosure provides new and innovative systems and methods for continuous testing of microservice applications. In an example, a computer-implemented method includes obtaining changes to source code, determining at least one related microservice related to the source code, determining at least one related microservice test related to the at least one microservice, executing automated tests to validate the source code, executing the at least one related microservice test to validate the at least one related microservice, generating test outcome data based on the automated tests and the at least one related microservice test, and providing a notification based on the test outcome data.

In an example, an apparatus includes a processor and a memory in communication with the processor and storing instructions that, when executed by the processor, cause the apparatus to obtain source code changes indicating at least one function defined in source code, determine at least one related microservice invoked by the at least one function, obtain at least one related microservice test related to the at least one microservice, validate the source code changes using automated tests, validate the at least one related microservice using the related microservice tests, generating test outcome data based on validating the automated tests and the at least one related microservice test, and provide a notification based on the test outcome data.

In an example, a non-transitory computer readable medium storing instructions that, when executed by one or more processors, cause the one or more processors to perform steps including obtaining changes to source code, wherein the changes indicate one or more functions of the source code, determining at least one related microservice based on the one or more functions of the source code, obtaining at least one related microservice test related to the at least one microservice, validating the source code using automated tests, validating the at least one related microservice using the related microservice tests. generating test outcome data based on validating the automated tests and the at least one related microservice test, and providing a notification based on the test outcome data.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, where.

DETAILED DESCRIPTION

Turning now to the drawings, techniques are disclosed for new and innovative systems and methods for continuous testing of microservice applications. In many aspects, software applications provide a variety of functions that, when invoked, cause the software application to perform corresponding actions. Software applications can be deployed in a variety of environments, particularly cloud-based and networked environments where the software application can be interacted with as a service by a variety of computing devices. Typical software applications utilize an application-server based model where the software application is provided by an application server. In several aspects, software applications utilize a service-based and/or microservice architecture where the software application provides and/or interacts with a variety of services, also known as dependencies. Updating software applications, particularly service-based applications, can be particularly challenging as typical processes for updating a software application includes updating the source code, recompiling the software application, and redeploying the software application. However, this typical upgrade process is error-prone and the updates to the software application often have unintended incompatibilities such that, when the updated software application is deployed, a variety of unanticipated errors occur that are not revealed by testing the various components of the software application individually. These errors then require additional development time to perform additional upgrades to the software application to correct the errors.

Applications developed using a microservice architecture are more challenging to test than traditional monolithic applications. The application is divided into multiple parts (e.g. services or microservices), each running individually in its own process or container. Each microservice is tested in isolation, mocking the interactions with the other microservices. To achieve this, developers typically use traditional testing frameworks such as Junit and Mockito. Continuous testing is a technique where tests run as code is changed; however, this generally can't be used to implement end-to-end testing of microservice applications. End-to-end testing is more problematic and typically does not happen until much later in the development process, generally in a continuous integration environment. Within the continuous integration environment, all the microservices are started and connected. The connective infrastructure (HTTP, message broker) is also running in the continuous integration environment. However, establishing a local continuous integration environment on a developer's computing device (e.g. within a local development environment) can be error-prone as continuous updates to the local testing environment are needed to reflect updates to various services being managed by other developers. Further, when a local testing environment relies on access to a continuous testing environment, a developer is unable to update the local testing environment or test their work while in environments where access to the continuous testing environment are not available, such as while traveling or during internet outages.

Systems and methods in accordance with aspects of the disclosure can automatically determine related microservices and test both updated software applications and related microservices in an end-to-end manner, allowing for continuous end-to-end testing of microservice applications in a local development environment. This allows end-to-end testing without having to establish a full end-to-end environment on a local development device and/or use a remote continuous testing environment. One or more functions within a microservice being modified can be analyzed to determine related functions in related microservices that are invoked within the function (e.g. upstream microservices) or that invoke the function (e.g. downstream microservices). Additionally, tests for each function, both the local functions and the related functions in the upstream and/or downstream services, can be identified. Test packages for these upstream and/or downstream services can be obtained and stored within the local development environment. In a variety of aspects, copies of the upstream and/or downstream services are packaged together with their automated tests and a copy of these services can be provided within the local development environment. When a local function is modified, the relevant tests for the local function and related functions can be executed to provide feedback without having to run an entire test suite. These automated tests may not be present at runtime but can be used to validate the microservices within a development environment, including those development environments that do not have access to deployed microservices. This allows for continuous end-to-end testing of an entire microservice application within a local development environment.

In a variety of aspects, software applications are developed using a container-based deployment model. These containers can include virtualized machines that execute within a virtual environment provided by an operating system of a computing device. Additionally, the automated tests for each microservice can be packaged in the container for that microservice. Each container can be isolated from other containers within the production environment to improve the security and/or portability of the containers. The containers can be transferred to other computing devices to deploy the software application in a variety of environments. In many aspects, the Docker Engine provided by Docker, Inc. can be used to implement the containers.

By performing continuous end-to-end testing of microservice applications within a local development environment, processes in accordance with aspects of the disclosure improve on the existing techniques by allowing for accurate and computationally efficient validation of software applications. The techniques described herein provide specific improvements over prior art systems by providing an improvement to the functioning of a computing device itself to automatically manage and update software applications, thereby improving the availability and security of the software applications. The improvements include, but are not limited to, reducing testing times and the consumption of computational resources while performing the application testing by only executing relevant tests for particular application modifications along with testing in the related microservices. This allows for continuous end-to-end testing within a local development environment, which is typically not possible in existing systems. By performing continuous testing as described herein, the techniques disclosed herein determine which tests are "relevant tests" to execute during each stage of application development, which reduces the likelihood of both over-testing and under-testing, which commonly plagues existing testing approaches. Over-testing lengthens testing times and wastes computational resources by performing unnecessary tests and duplicating testing efforts. Under-testing may result in applications being launched for commercial deployment while inadvertently containing software bugs that may negatively affect application performance. By reducing the likelihood of both over-testing and under-testing, continuous application testing may be performed more efficiently, with faster turn-around times and without wasting computational resources (e.g., computational resources used while executing unnecessary tests) while ensuring that the relevant parts of the application are tested to their full extent before a commercial or enterprise release.

A variety of systems and methods in accordance with aspects of the disclosure are described in more detail below.

Figure 1:
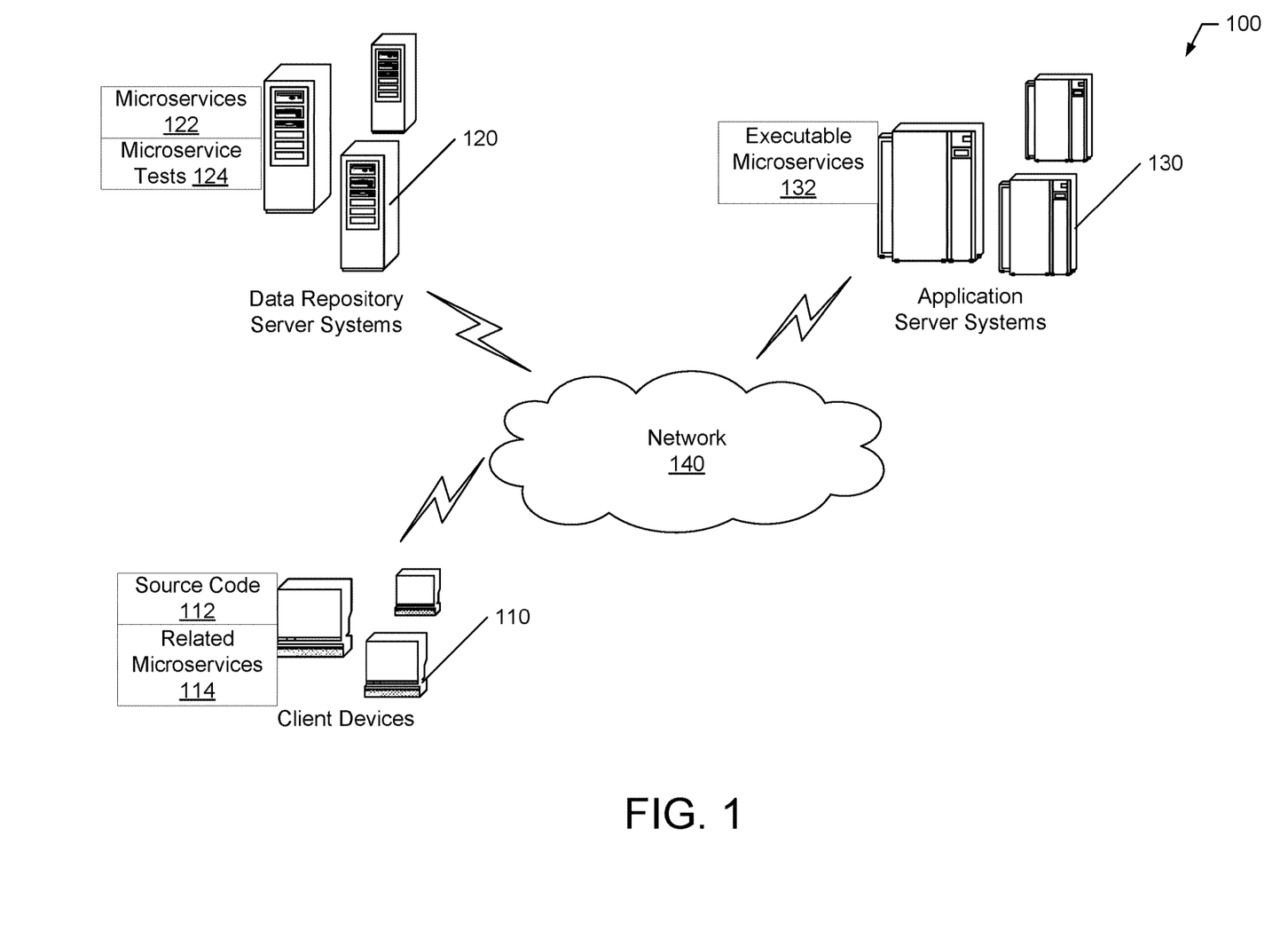
FIG. 1 illustrates a block diagram of a computing system according to an example aspect of the present disclosure.

FIG. 1 illustrates a block diagram of a computing system according to an example aspect of the present disclosure. The computing system 100 can include client devices 110, data repository server systems 120, and/or application server systems 130 in communication via network 140. In many aspects, the data repository server systems 120 and/or application server systems 130 are implemented using a single server. In a variety of aspects, the data repository server systems 120 and/or application server systems 130 are implemented using a plurality of servers. In several aspects, client devices 110 are implemented utilizing the data repository server systems 120 and/or application server systems 130. In a variety of aspects, the data repository server systems 120, and/or application server systems 130 are implemented using the client device 110.

Client devices 110 can provide local development environments, obtain a variety of data (such as source code 112 and/or related microservices 114), determine related microservices, validate software applications, provide source code to be stored in a source code repository, and/or deploy software applications to production environments as described herein. Data repository server systems 120 can provide a variety of source code, automated tests, and/or related microservices (such as microservices 122 and/or microservice tests 124) as described herein. In several aspects, data repository system servers 120 can include source code repository server systems and/or dependency repository server systems. Source code repository server systems can provide a variety of source code and/or automated tests, while the dependency repository server systems provide dependencies and/or updates to those dependencies. Application server systems 130 can host software applications and/or provide a production environment (such as a client-server environment, a networked environment, a cloud-based environment, and the like) allowing access to one or more services (e.g. executable microservices 132) provided by the software applications as described herein.

Any of the computing devices shown in FIG. 1 (e.g. client devices 110, data repository server systems 120, and application server systems 130) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

As described herein, software applications can be generated based on source code and automated tests can be used to validate the correct operation of the software application. The automated tests can include tests for functions being modified in a local development environment and related tests for related microservices that are not currently being modified in the local development environment. The automated tests can be used to validate the local functions in a microservice, upstream functions and/or downstream functions in related microservices, and/or the software application. In this way, continuous end-to-end testing of a microservice application can be performed within a local development environment.

Figure 2:
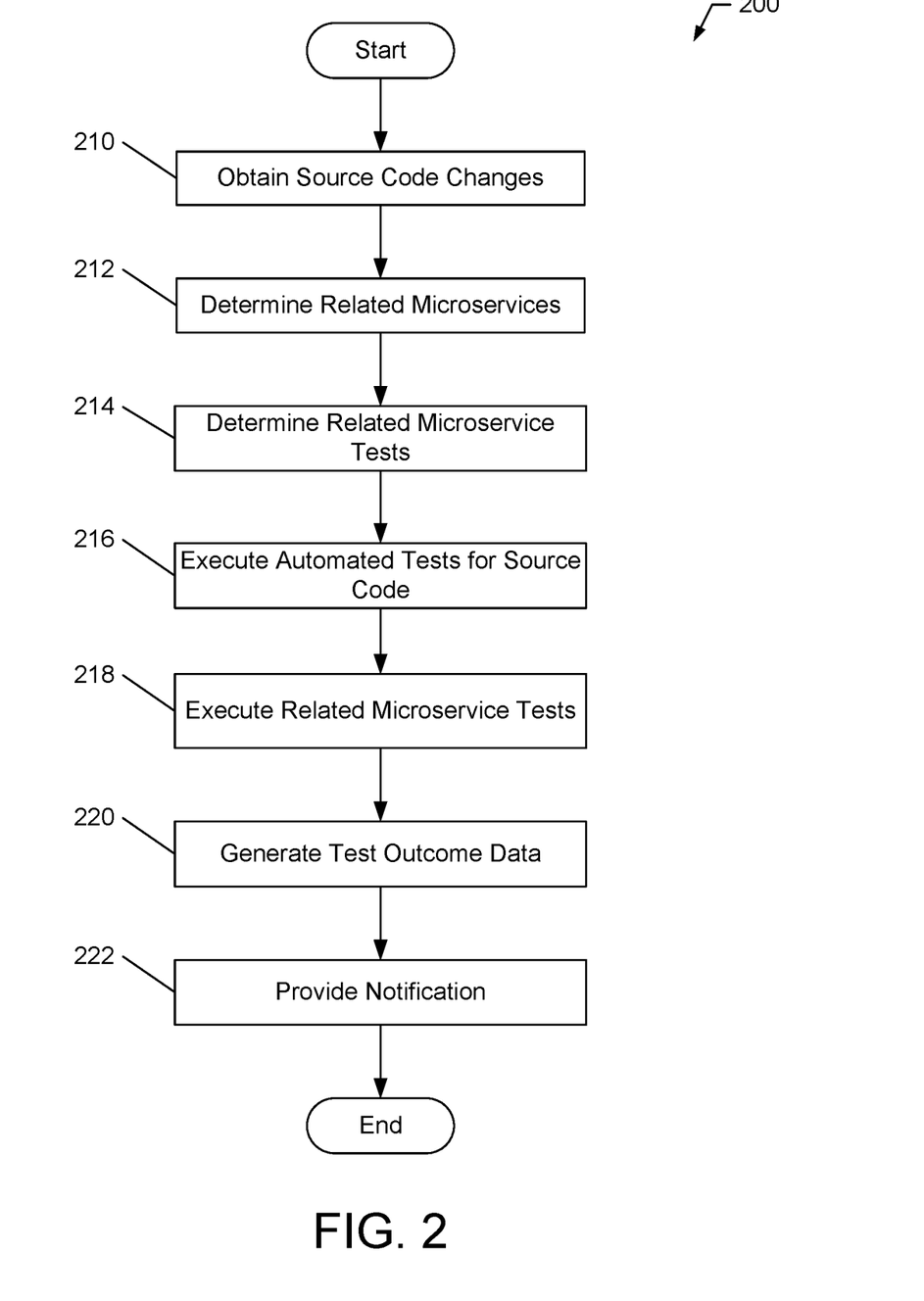
FIG. 2 illustrates a flowchart of a process for continuous testing of microservice applications according to an example aspect of the present disclosure.

FIG. 2 illustrates a flowchart of a process for continuous testing of microservice applications according to an example aspect of the present disclosure. Although the process 200 is described with reference to the flowchart illustrated in FIG. 2, it will be appreciated that many other methods of performing the acts associated with the process 200 may be used. For example, the order of some of the blocks may be changed, certain blocks may be combined with other blocks, one or more blocks may be repeated, and some of the blocks described are optional. The process 200 may be performed by processing logic that may include hardware (circuitry, dedicated logic, etc.), software, or a combination of both.

Source code changes can be obtained (block 210). The source code changes can include modifications to one or more functions defined in the source code. Source code can include a variety of instructions written in a programming language that can be compiled by an assembler or compiler into a software application that can be executed by a computing device. In several aspects, the source code can be interpreted by an interpreter for execution by the computing device. The source code can define one or more functions that include instructions to perform specific action(s) associated with the function. These functions can be private (e.g. only visible and/or usable by the software application itself) and/or public (e.g. visible and/or usable outside the software application). For example, a web service or other application programming interface (API) can provide access to one or more public functions defined in the source code. In many aspects, one or more functions of the software application can correspond to services (e.g. microservices) provided by the software application. The source code can also include references to one or more dependencies. A dependency can include source code and/or object code (e.g. executable programs, libraries, microservices, and the like) that are utilized by, but are separate from, the software application. These dependencies can provide one or more functions and/or APIs that can be invoked from the function defined in the source code.

Related microservices can be determined (block 212). A related microservice can include functions (e.g. related functions) that either reference (e.g. invoke) the modified function(s) indicated in the source code changes and/or functions that are invoked by the modified function(s) indicated in the source code changes. Microservices that invoke the modified function(s) can be referred to as downstream microservices, while microservices that provide the functions invoked by the modified function(s) can be referred to as upstream microservices. This analysis can be a recursive process that looks into each found downstream and/or upstream microservices. The related microservices can be stored using a graph database containing nodes and edges. A node can indicate a microservice having one or more functions. An edge can connect two nodes and indicate a first function provided by a first microservice that is referenced or invoked by a second function provided by the second microservice. In a variety of aspects, the graph database is a directed graph, where the direction of an edge indicates the relationship between the first function and the second function (e.g. upstream or downstream). A variety of techniques for determining related microservices and their associated functions are described in more detail with respect to FIG. 4.

Related microservice tests can be determined (block 214). The related microservice tests can include automated tests for the related microservices. The automated tests can be used to test and validate any operation of the related microservices, such as validating the operation of one or more functions calling or invoked by the modified function(s) and the like. Automated tests can include, but are not limited to, unit tests, integration tests, performance tests, acceptance tests, installation tests, compatibility tests, sanity tests, regression tests, functional tests, non-functional tests, conformance tests, output tests, and/or any other tests utilized in the development of software applications as used by a person having ordinary skill in the art. In many aspects, the related tests for a microservice are a subset of the automated tests for the microservice that test the upstream and/or downstream functions.

Automated tests can be executed on the source code (block 216). The automated tests can be executed to validate the modified function(s) indicated in the obtained source code changes. Validating a function can include executing the automated tests to determine that one or more function(s) perform the appropriate functionality specified in the source code and/or requirements documents, determining the function responds appropriately to valid and invalid inputs, determining the function performs its operation(s) in an acceptable time and/or with an acceptable usage of computing resources (e.g. processor power, memory usage, and the like), properly interacts with any dependencies, and the like. The automated tests can be executed in order to validate the source code, object code, and/or software application as appropriate to the specific tests being performed.

Related microservice tests can be executed (block 218). The related microservice tests can be executed to validate the operation of the related functions. The related functions can be validated to ensure that the related functions and/or the related microservices operate correctly in view of the modified function(s). In a variety of aspects, the related microservice tests are executed by traversing the graph database. The graph database can be traversed using any graph traversal method, such as depth-first search or breadth-first search. At each node, each of the related functions indicated by the edges can be validated by executing the automated tests associated with the related functions. As the related microservices and/or related microservice tests are stored within the local development environment, this allows for a complete end-to-end test suite to be executed within the local development environment.

Test outcome data can be generated (block 220). The test outcome data can indicate the function(s) tested, the microservice(s) tested, the results of the executed tests (e.g. pass, fail, an indication of the failure, and the like), and/or any other information as appropriate. For example, once testing is complete, the test outcome data can indicate that all tests pass and the changes indicated in the source code changes are suitable for integration into a source code repository and/or deployed to a production environment.

One or more notifications can be provided (block 222). The notifications can indicate the test outcome data. The notifications can be provided to a variety of systems such as, but not limited to, a local developer machine, a data repository server system, and/or an application server system. In several aspects, the notifications can be provided within an integrated development environment executing on the local developer machine. In a number of aspects, the notifications can be provided as pop-up notification, a short message service message, and/or any other push notifications on any of a variety of computing devices, such as the local developer machine and/or a mobile device. In several aspects, the notification indicates the dependencies detected between the modified functions and the related microservices. In this way, the notification can be used to audit dependencies within a microservice application. In the event that unexpected dependencies are identified, those dependencies can be targeted for refactoring or revision. In a variety of aspects, the notification is provided to a data repository server system indicating the source code changes should be checked into a source code repository maintained by the data repository server system. In many aspects, the notification can be provided to an application server system indicating that a microservice incorporating the source code changes should be published to a production environment.

Figure 3:
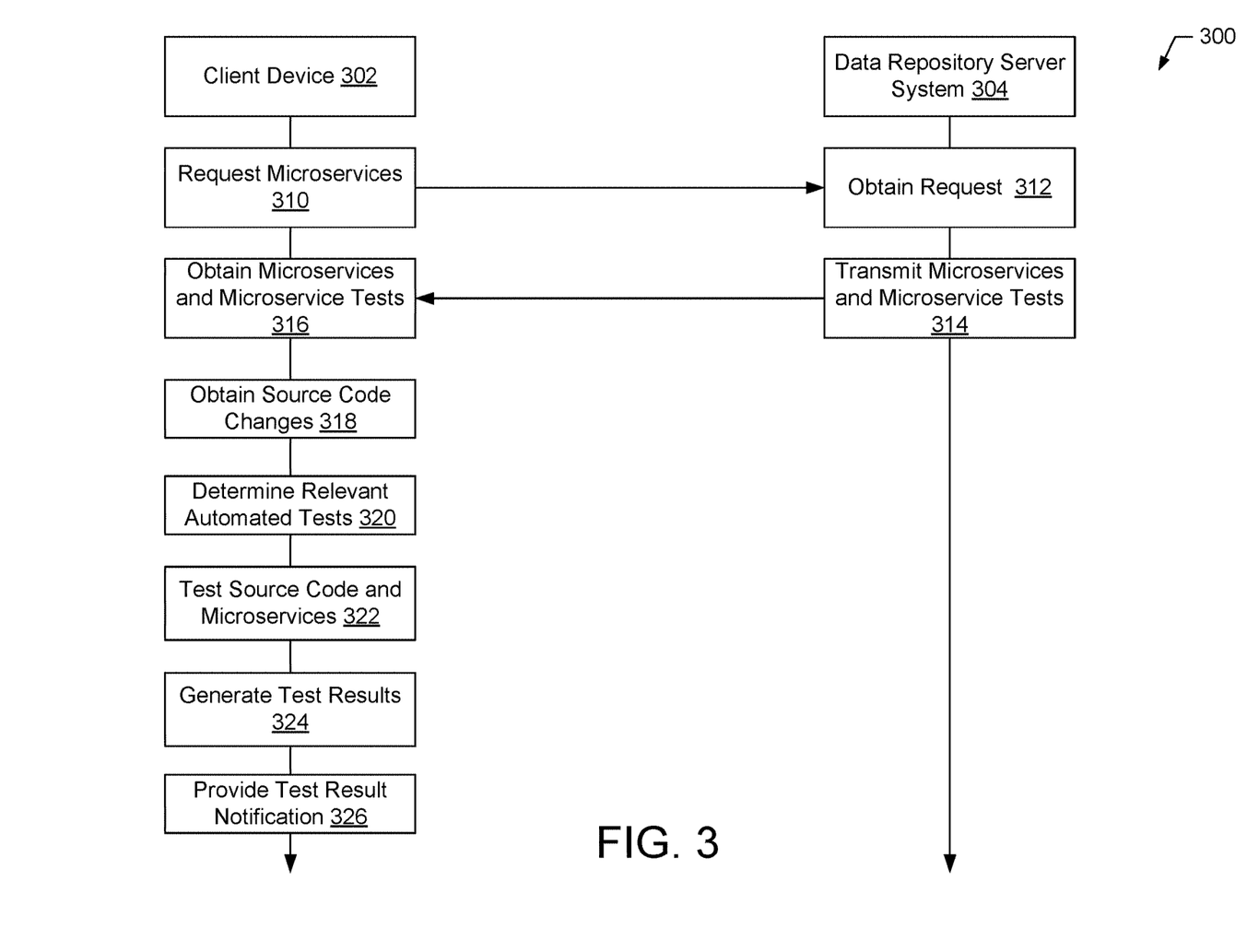
FIG. 3 illustrates a flow diagram of a process for continuous testing of microservice applications according to an example aspect of the present disclosure.

FIG. 3 illustrates a flow diagram of a process for continuous testing of microservice applications according to an example aspect of the present disclosure. Although the process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, one or more blocks may be repeated, and some of the blocks described are optional.

At block 310, client device 302 can transmit a request for microservices to data repository server system 304. The request for microservices can indicate one or more upstream and/or downstream functions and/or microservices that are related to a modified function as described herein. At block 312, the data repository server system 304 can obtain the request. At block 314, the data repository server system 304 can transmit the requested microservices and/or microservice tests to the client device 302. At block 316, the client device 302 can obtain the requested microservices and/or microservice tests from the data repository server system 304.

At block 318, the client device 302 can obtain source code changes. The source code changes can include changes to one or more modified functions as described herein. In many aspects, the source code changes are obtained from an integrated development environment provided by (or in) a local development environment. At block 320, the client device 302 can determine relevant automated tests. The relevant automated tests can include automated tests for the modified function(s), any upstream functions, and/or any downstream functions as described herein. At block 322, the client device 302 can executed the relevant automated tests to test the source code and the related microservices. In a variety of aspects, the relevant automated tests can include those automated tests that test the modified function(s), the upstream functions, and/or the downstream functions. At block 324, the client device 302 can generate test results indicating the results of executing the relevant automated tests as described herein. At block 326, the client device 302 can provide a test result notification indicating the test results as described herein.

Figure 4:
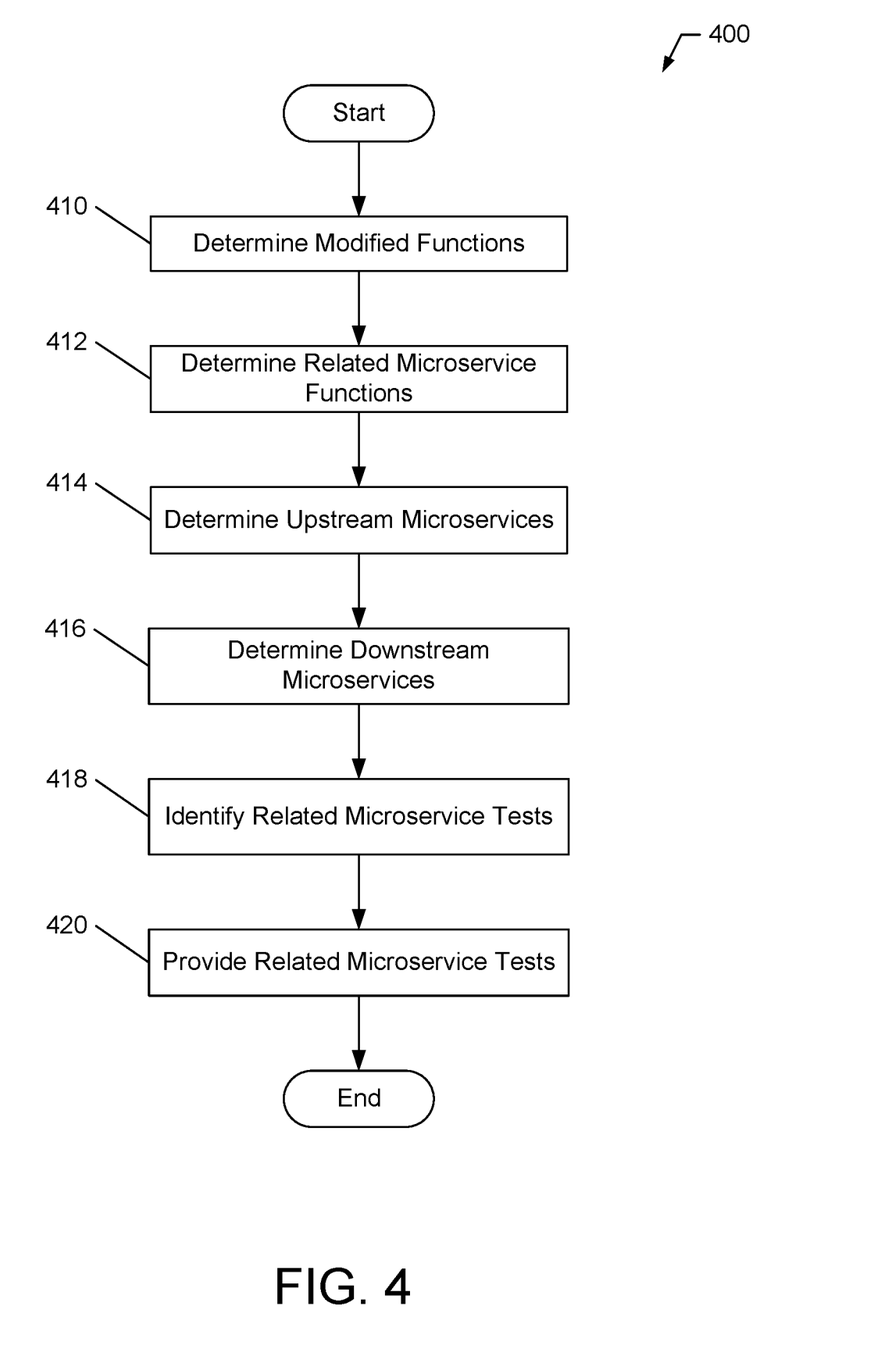
FIG. 4 illustrates a flowchart of a process for determining relevant microservice tests according to an example aspect of the present disclosure.

FIG. 4 illustrates a flowchart of a process for determining relevant microservice tests according to an example aspect of the present disclosure. Although the process 400 is described with reference to the flowchart illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. The process 400 may be performed by processing logic that may include hardware (circuitry, dedicated logic, etc.), software, or a combination of both.

Modified functions can be determined (block 410). A modified function can be a function that has one or more source code changes associated with the function. The modified function can be defined in a microservice as described herein.

Related microservice functions can be determined (block 412). Related microservice functions can include functions that are invoked by the modified function and functions that invoke the modified function. The related microservice functions can be defined in related microservices as described herein. In many aspects, determining the related microservice functions includes analyzing the source code of the modified function to determine dependencies in the source code that indicate the related microservice function. In a number of aspects, determining the related microservice functions includes analyzing the source code of the microservice function to determine dependencies in the microservice function that indicate the modified function.

Upstream microservices can be determined (block 414). Upstream microservices can include related microservices that provide a function that is invoked by the modified function. In several aspects, upstream microservices can be determined by scanning the source code for the modified function to identify the microservices providing the upstream functions invoked by the modified function. In many aspects, upstream microservices are identified based on build metadata indicating microservices that are related to a source microservice providing the upstream functions.

Downstream microservices can be determined (block 416). Downstream microservices can include related microservices that provide a function that invoke the modified function. In many aspects, downstream microservices are identified based on build metadata indicating microservices that are related to a source microservice providing the modified functions. Each function of the indicated microservices can be analyzed to determine if the function invokes the modified function. When such a function exists, the microservice providing the function can be determined to be a downstream microservice.

Related microservice tests can be identified (block 418). The related microservice tests can include automated tests for the related microservice functions. The related microservice tests can be defined by, included in, provided in addition to, and/or otherwise associated with the upstream microservices and the downstream microservices as described herein.

In a variety of aspects, the related functions, upstream microservices, and/or downstream microservices can be determined by modifying the functions during the testing and/or execution of the microservices. For example, the functions can be transformed such that the functions record their usage during testing. When each microservice is tested, the functions that are accessed when executing each automated test can be recorded. For example, various tests making up an entire testing suite may be run to test the microservice and related microservices. During or after test execution, a record or log may be made to record which functions were accessed by which respective tests. When a function is modified, the tests associated with the function can be identified, thereby allowing only the identified tests to be executed to test the modified function instead of the entire microservice and related microservices. In several aspects, the functions and/or microservices can be stored using a graph database, where each node in the graph database indicates a microservice and an edge connecting two nodes indicates a dependency between a first function provided by a first microservice and a second function provided by a second microservice as described herein. In a number of aspects, the edges can be directional, where the direction of the edge indicates if the dependency is an upstream or downstream dependency.

Related microservice tests can be provided (block 420). The related microservice tests can be provided to a local development environment. In several aspects, the related microservice tests are bundled with the related microservices and the related microservices are provided. In many aspects, providing the related microservice tests includes providing a graph database (or any other data structure) representing the relationships between the microservices and functions as described herein.

Figure 5:
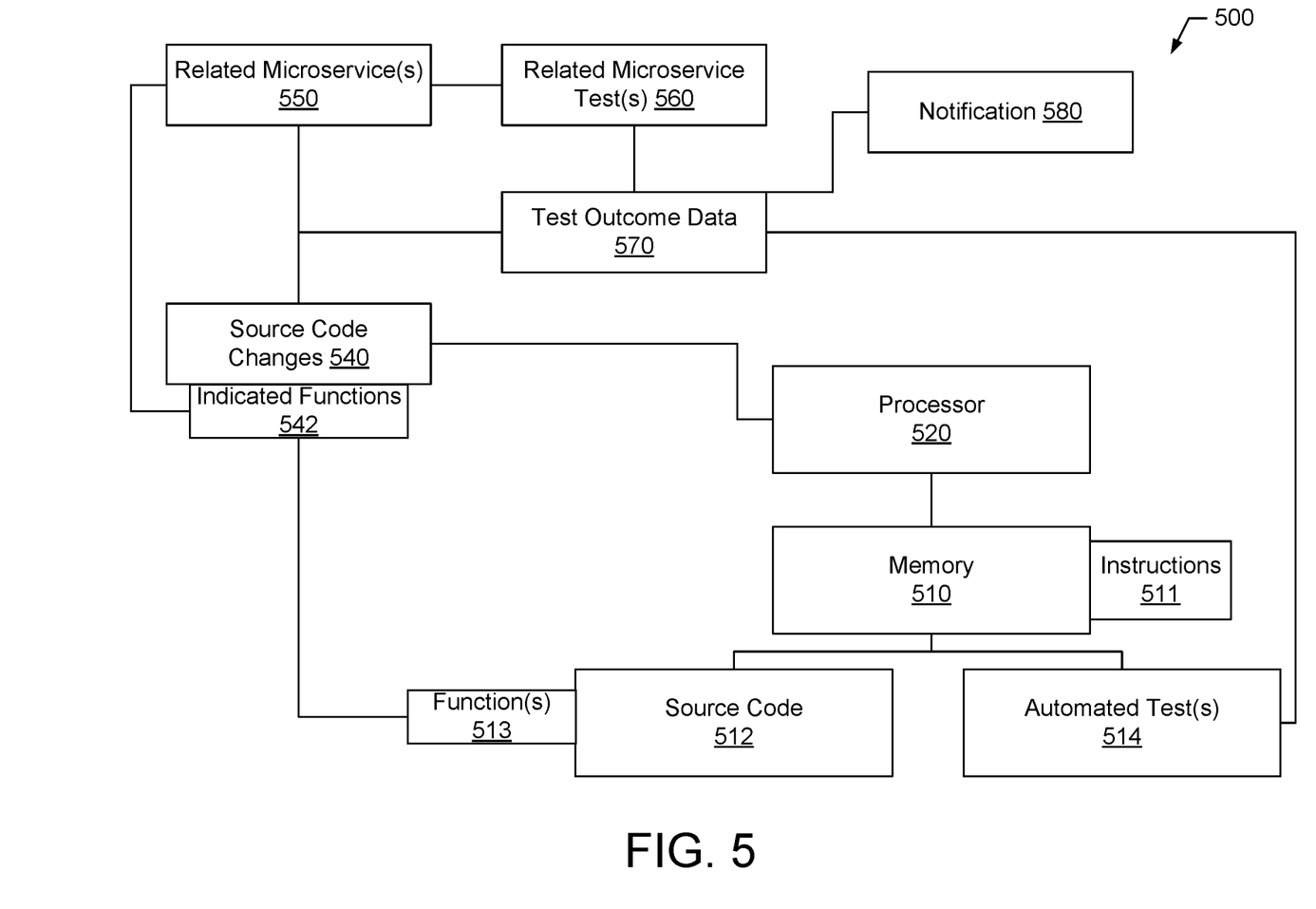
FIG. 5 illustrates a block diagram of an apparatus according to an example aspect of the present disclosure.

FIG. 5 illustrates a block diagram of an apparatus according to an example aspect of the present disclosure. The system 500 includes a memory 510 and a processor 520 in communication with the memory 510. The memory 510 can store instructions 511 that, when executed by the processor 520, cause the system 500 to perform a variety of processes as described herein. The instructions 511 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The memory 510 can store source code 512 and automated tests 514. The source code 512 can define one or more functions 513. The processor 520 can obtain source code changes 540 having one or more indicated functions 542. The source code changes 540 can include changes to the source code 512 and the indicated functions 542 can include some or all of the functions 513. The processor 520 can determine at least one related microservice 550 that is related to the indicated functions 542. In several aspects, the source code changes 540 and/or indicated functions 542 can be used to identify the related microservices 550. The related microservices 550 can provide one or more functions that are invoked by the indicated functions 542 and/or invoke the indicated functions 542 as described herein. That is, the related microservices 550 can include upstream microservices and/or downstream microservices as described herein. The processor 520 can obtain related microservice tests 550. The related microservices 550 can be associated with related microservice tests 560. The related microservice tests 560 can include one or more automated tests for the functions provided by the related microservices 550. The processor 520 can validate the source code changes 540 using automated tests 514 and validate the related microservices 550 using the related microservice tests 560. In a variety of aspects, the source code changes 540 can be validated by executing automated tests 514 that are related to the indicated functions 542 as described herein. In several aspects, the microservices 550 can be validated by executing the related microservice tests 560 that are associated with functions that are upstream or downstream of the indicated functions 542 as described herein. Test outcome data 570 can be generated by the processor 520. In many aspects, the test outcome data 570 is generated based on the results of executing the automated tests 514 on the indicated functions 542 and the related microservice tests 560 on the related microservices 550. The processor 520 can provide a notification 580 based on the test outcome data 570. The notification 580 can include the test outcome data, relationships between microservices, and/or any other information as described herein.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, aspects of the present disclosure should be considered in all respects as illustrative and not restrictive. It will be evident to the annotator skilled in the art to freely combine several or all of the aspects discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
   obtaining changes to source code for a first microservice;
   analyzing the changes to the source code to determine a function of the source code associated with the changes;
   identifying a second microservice that invokes or is invoked by the function associated with the changes, wherein the second microservice is different from the first microservice;
   based on identifying the second microservice, obtaining a microservice test related to the second microservice;
   executing automated tests to validate the source code with the changes, wherein the automated tests are separate from the microservice test related to the second microservice;
   executing the microservice test to validate the second microservice;
   generating test outcome data based on executing the automated tests and the microservice test; and
   providing a notification based on the test outcome data.

2. The computer-implemented method of claim 1, further comprising:
   generating an application based on the source code; and
   deploying the generated application to a production environment.

3. The computer-implemented method of claim 2, wherein the production environment hosts the first and second microservices.

4. The computer-implemented method of claim 2, wherein the generated application comprises a plurality of microservices.

5. The computer-implemented method of claim 1, wherein a package for the second microservice comprises the microservice test.

6. The computer-implemented method of claim 1, further comprising:
   determining a set of functions associated with the automated tests; and
   determining the second microservice based on the set of functions.

7. The computer-implemented method of claim 6, wherein the function of the first microservice is a first function, and further comprising:
   determining a second function based on the first function, wherein the second function is part of the second microservice, and wherein the second function is invoked by or invokes the first function; and
   determining the microservice test based on the second function.

8. An apparatus, comprising:
   a processor; and
   a memory in communication with the processor and storing instructions that, when executed by the processor, cause the apparatus to:
      obtain changes to source code for a first microservice, the changes involving a function defined in the source code;
      identify a second microservice that invokes or is invoked by the function associated with the changes, wherein the second microservice is different from the first microservice;
      based on identifying the second microservice, obtain a microservice test related to the second microservice;
      execute automated tests to validate the source code with the changes, wherein the automated tests are separate from the microservice test related to the second microservice;
      execute the microservice test to validate the second microservice;
      generate test outcome data based on executing the automated tests and the microservice test; and
      provide a notification based on the test outcome data.

9. The apparatus of claim 8, wherein the instructions, when executed by the processor, further cause the apparatus to:
   generate an application based on the source code; and
   deploy the generated application to a production environment.

10. The apparatus of claim 9, wherein the production environment hosts the first and second microservices.

11. The apparatus of claim 9, wherein the generated application comprises a plurality of microservices.

12. The apparatus of claim 8, wherein a package for the second microservice comprises the microservice test.

13. The apparatus of claim 8, wherein the function is a first function, and wherein the instructions, when executed by the processor, further cause the apparatus to:
   determine a second function based on the first function, wherein the second function is part of the second microservice, and wherein the second function is invoked by or invokes the first function; and determine the microservice test based on the second function.

14. The apparatus of claim 8, wherein the automated tests and the microservice test are selected from the group consisting of unit tests, integration tests, and performance tests.

15. A non-transitory computer readable medium storing instructions that, when executed by one or more processors, cause the one or more processors to perform steps comprising:
  obtaining changes to source code for a first microservice, wherein the changes involve a function of the source code;
  analyzing the changes to the source code to determine the function associated with the changes;
  identifying a second microservice that invokes or is invoked by the function associated with the changes, wherein the second microservice is different from the first microservice;
  based on identifying the second microservice, obtaining a microservice test related to the second microservice;
  validating the source code using automated tests;
  validating the second microservice using the microservice tests;
  generating test outcome data based on validating the automated tests and the microservice test; and
  providing a notification based on the test outcome data.

16. The non-transitory computer readable medium of claim 15, wherein the instructions, when executed by one or more processors, further cause the one or more processors to perform steps comprising:
  generating an application based on the source code; and
  deploying the generated application to a production environment.

17. The non-transitory computer readable medium of claim 16, wherein the production environment hosts the first and second microservices.

18. The non-transitory computer readable medium of claim 16, wherein the generated application comprises a plurality of microservices.

19. The non-transitory computer readable medium of claim 15, wherein a package for the second microservice comprises the microservice test, and wherein the microservice test is obtained from the package.

20. The non-transitory computer readable medium of claim 15, wherein the instructions, when executed by one or more processors, further cause the one or more processors to perform steps comprising:
  determining a second set of functions that invoke or are invoked by a first set of functions defined in the source code for the first microservice, wherein the changes involve the first set of functions;
  determining a set of microservices that include the second set of functions;
  determining a set of microservice tests based on the second set of functions; and
  executing the set of microservice tests with respect to the set of microservices to generate at least some of the test outcome data.

* * * * *